United States Patent [19]

Yuzuru

[11] Patent Number: 4,829,677
[45] Date of Patent: May 16, 1989

[54] DEVICE FOR SUPPORTING A STYLUS IN A TOUCH SENSOR

[75] Inventor: Tanaka Yuzuru, Higashi-Osaka, Japan

[73] Assignee: Daishowa Seiki Co., Ltd., Osaka, Japan

[21] Appl. No.: 128,694

[22] Filed: Dec. 4, 1987

[30] Foreign Application Priority Data

Dec. 10, 1986 [JP] Japan ............................ 61-190395[U]

[51] Int. Cl.[4] .............................................. G01B 7/28
[52] U.S. Cl. ........................................ 33/561; 33/503; 33/832; 33/642
[58] Field of Search ................. 33/556, 557, 558, 559, 33/560, 561, 169 R, 169 C, 172 D, 172 E, 642

[56] References Cited

U.S. PATENT DOCUMENTS

| | | | |
|---|---|---|---|
| 4,270,275 | 6/1981 | McMurtry | 33/561 |
| 4,462,162 | 7/1984 | McMurtry | 33/561 |
| 4,608,763 | 9/1986 | Manns et al. | 33/558 |
| 4,701,704 | 10/1987 | Fukuyoshi et al. | 33/558 |
| 4,702,013 | 10/1987 | McMurtry | 33/503 |

*Primary Examiner*—William D. Martin, Jr.
*Attorney, Agent, or Firm*—Koda and Androlia

[57] ABSTRACT

A device for supporting a stylus in a touch sensor comprises a casing, a stylus having its one end part protruding out of the casing for detecting an object, and a spring for pressing an inner base part of the stylus housed concentrically in the casing outwards from behind wherein a ball is provided at each of three abaxial positions on one of the mutually opposite faces of the stylus inner base part and an end part of the casing while an engaged part with which the ball is allowed to come into contact is configured at each of three corresponding positions on the other of said opposite faces, the three engaged parts are configured respectively into different shapes so the stylus can be kept steady in the casing.

2 Claims, 2 Drawing Sheets

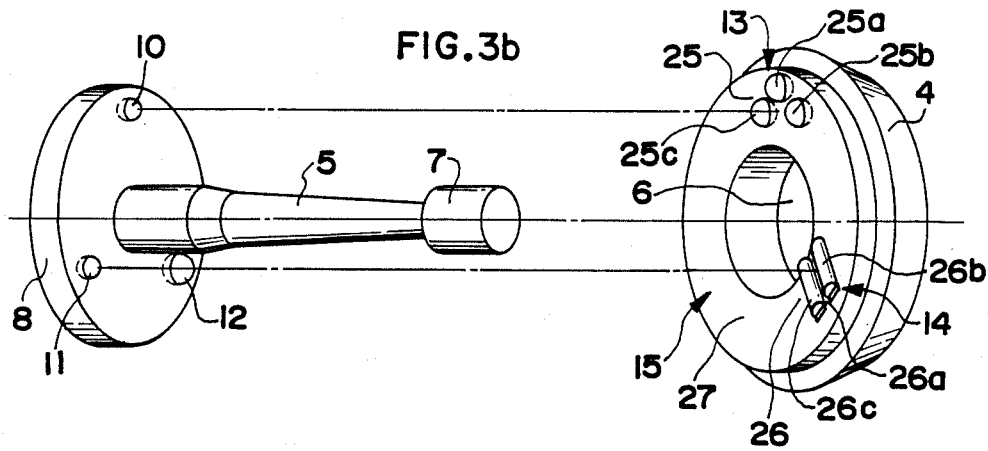
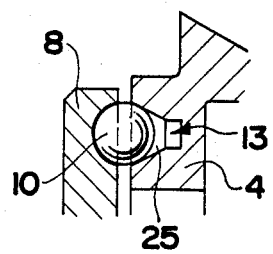
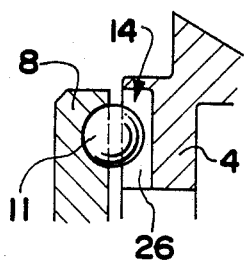
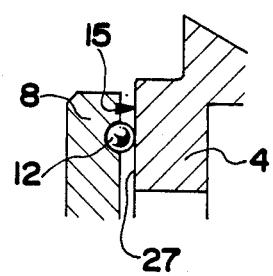
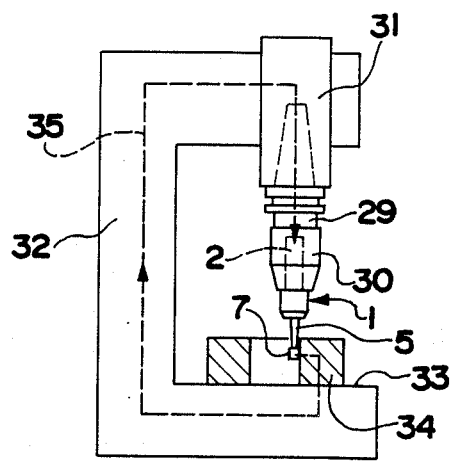

DEVICE FOR SUPPORTING A STYLUS IN A TOUCH SENSOR

BACKGROUND OF THE INVENTION

The present invention relates generally to an improved touch sensor for detecting the presence of an object and measuring the relative position of the objects, adapted to be attached to a spindle of machine tools such as general-purpose milling machines, machining centers and numerical control lathers, and more particularly to a device for supporting a stylus in a touch sensor.

Such a touch sensor is designed to electrically sense the workpiece of an object by the contact of the stylus therewith, and furthermore, inside a casing of the touch sensor, the stylus is supported at the axial center position by a spring so as to be allowed to move relative to the casing when the stylus comes into contact with the workpiece; consequently never receiving an excessive pressure.

For example, the Japanese Patent Publication (examined) No. 58-17402 open to the public on Apr. 7, 1983 discloses a touch sensor, wherein the base part of the stylus is provided with three bars projecting radially therefrom, of which the end parts are supported by three respective pairs of balls placed in the casing. However, such structure as employed in the prior art requires the increased number of constituent members, i.e. three bars and three pairs of balls (six balls), and further requires the precise processing of the corresponding parts of the stylus and casing where the bars and the balls are mounted, thereby resulting in an increased cost of production.

OBJECT AND SUMMARY OF THE INVENTION

The present invention aims at solving the problems pointed out with respect to the known touch senor, and has for its object to provide an improved touch sensor, i.e. a device for supporting a stylus in a touch sensor which is simplified by the decreased number of constituent members without the need of complicated processing so as to result in a reduced cost of production.

Other objects and advantages of the present invention will become apparent from the detailed description given hereinafter.

According to the present invention, there is provided a device for supporting a stylus in a touch sensor comprising a casing, a stylus and a spring, arranged respectively in alignment wherein a ball is provided at each of three positions around the axial center on one of the surfaces opposite to one another while an engaged part is configured at each of the positions corresponding to the balls on the other of the surfaces, of the inner base part of a stylus and the part of a casing, and a spring presses the inner base part of the stylus outwards, the configuration of each engaged part is different.

BRIEF DESCRIPTION OF THE INVENTION

FIG. 3b is an exploded perspective view of a modified embodiment;

Figure 3A:
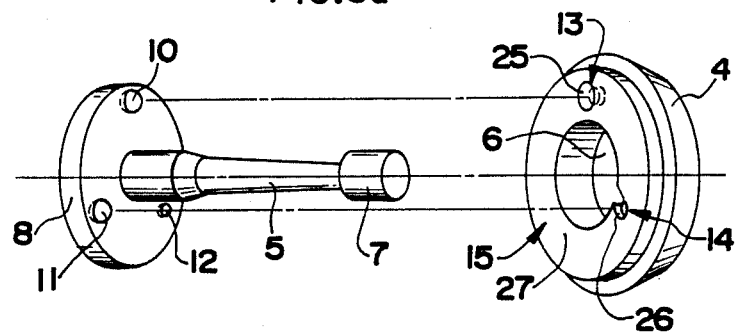
FIG. 3a is an exploded perspective view of the principal parts of the embodiment in FIG. 1.

FIGS. 4 to 6 inclusive are enlarged longitudinal sections of the principal parts of FIG. 3a;

FIG. 7 is a diagram of assistance in explaining a state in use of the embodiment.

DETAILED DESCRIPTION OF THE PREFERRED EMBODIMENT

An embodiment of the present invention is described below with reference to the accompanying drawings.

Figure 1:
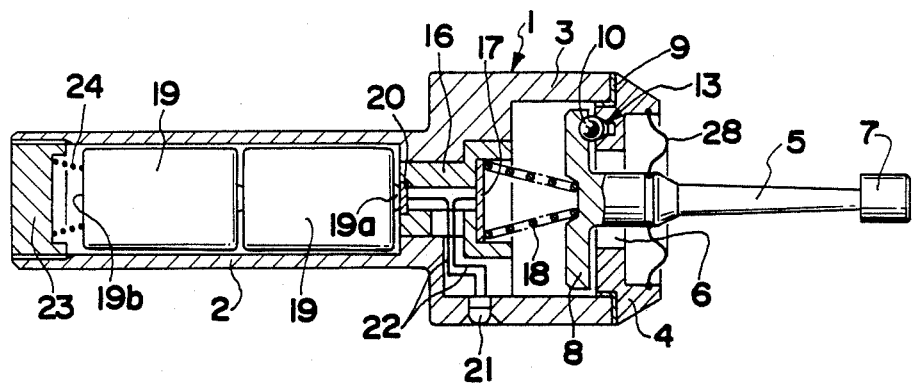
FIG. 1 is a longitudinal section of a preferred embodiment of the present invention.
Figure 2:
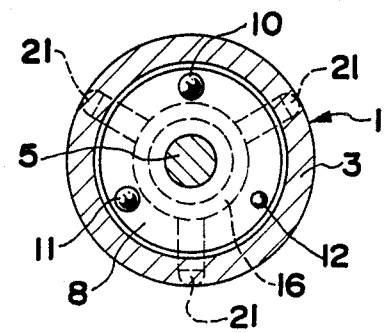
FIG. 2 is a transverse section of FIG. 1.

In FIGS. 1 to 3 inclusive, the reference numeral 1 denotes a casing of conductor, which comprises a dry cell accommodation 2 which accommodates two dry cells, a stylus supporting part 3 which is hollow and open at one side end, and a cap 4 for covering the aforesaid opening of the supporting part 3 except for the axial center. The reference numeral 5 is a stylus of conductor arranged in alignment with the casing 1, having a contact head 7 at outer one end part, and further having a flange 8 at another inner end part base which is placed inside the stylus supporting part 3. The one end having the head 7 of the stylus 5 is protruded outwards through the axial central opening 6 of the cap 4 from the stylus supporting part 3. At the connection of the stylus supporting part 3 and the cap 4, there is sandwiched a layer of insulator 9 therebetween.

The flange 8 of the stylus is provided with three balls 10, 11, 12 of steel at three equally spaced positions around the axis of the stylus on the surface opposite to the cap 4, which balls are embedded partially in depressions of the flange. On the other hand, on the inwards directed face of the cap 4 there are configured three of first, second, third engaged parts 13, 14, 15 at the corresponding parts opposite to the aforesaid balls 10, 11, 12, as described in details later.

The reference numeral 16 denotes a hollow electrical insulating member which is inserted inside the casing 1, from the inner end of the dry cell accommodation 2 to the stylus supporting part 3. In one end, open to the accommodation 2, of the insulating member 16, there is fitted a contact plate 20 which touches the anode 19a of one of the dry cells 19 housed in the accommodation 2, while in another end open to the stylus flange 8 there is fitted a conducting plate 17. Between the conducting plate 17 and the stylus flange 8 there is interposed axially a compression coil spring 18. The reference numeral 21 denotes light emitting diodes for indication which are embedded respectively in the stylus supporting part 3 itself at three equally spaced positions on one plane, which diodes 21 are connected by wires 22 to the conducting plate 17 and the contact plate 20. The reference numeral 23 denotes a back lid of the dry cell accommodation 2, which is communicated electrically through a spring 24 to the cathode 19b of the dry cell 19.

As shown in FIGS. 3 to 6 inclusive, the first engaged part 13 of the cap 4 is shaped into a hollow 25 in which the exposed part of the ball 10 is fitted, and the second engaged part 14 is shaped into a groove in which the exposed part of the ball 11 is fitted, and further the third engaged part 14 is shaped into a flat face 27 which the exposed part of the ball 12 touches. The aforesaid hollow 25 of the cap has a circular shape in cross-section to the axis as shown in FIG. 3a. However, as shown in FIG. 3b, it is possible to form a hollow by at least three encircling semi-spherical projections from the flange 4 at equal intervals between each other if such a hollow is of a construction by which the stylus 5 can be prevented from moving straight on a plane perpendicular to the axis thereof. The groove 26 has a rectangle in section parallel to the axis as shown in FIG. 3a. However, as shown in FIG. 3b, it is possible to form a groove by a pair of long, narrow projections from the surface of the cap 4 at an appropriate interval if such a groove is of a construction by which the stylus can be prevented from rotating on the axis. It is preferred that the groove 26 has its length directed to the hollow 25. In addition, in the form of the flat face 27 of the third engaged part 15, the inner surface of the cap 4 is employed as it is, without producing an additional configuration. The balls 10, 11, are fitted respectively into the hollow 25 and the groove 26 at the determined depth, and the ball 12 is brought into contact with the flat face 27 of the cap 4 by the pressure of the spring 18, so that the stylus 5 is kept steady at the axial center in a state concentric with the axis of the casing 1. The reference numeral 28 denotes a rubber sealing member for protection against outside dust, which covers between the cap 4 and the stylus 5.

In the touch sensor so constructed above, it is impossible for the stylus 5 to move outwards by the pressure of the coil spring 18, since the outward movement of the stylus 5 is regulated by the engagement of the three balls 10, 11, 12 with the respective engaged parts 13, 14, 15 of the cap 4. In addition, it is impossible for the stylus 5 to move straight on the plane perpendicular to the axis, since the straight movement of the stylus 5 is blocked by the engagement of the ball 10 with the hollow 25 of the first engaged part 13. Moreover, it is impossible for the stylus 5 to move around the ball 10 or the hollow 25 of the first engaged part 13 on the axis, since the rotation of the stylus 5 is blocked by the engagement of the ball 11 with the groove 26 of the second engaged part 14. For these reasons, the stylus 5 is located in three dimensions while being kept steady in the axial central position of the casing by the pressure of the spring 18.

The stylus 5 is communicated electrically to the anode 19a of one of the dry cells 19 through the coil spring 18, the conducting plate 17, the wires 22 and the indicating light emitting diode 22, but not to the stylus supporting part 3 and the accomodation 2 of the casing 3 which is communicated electrically to the cathode of one of the dry cells 19.

To give an example used of the above-mentioned touch sensor according to the present invention, as illustrated in FIG. 7, the casing 1 is mounted indirectly on the spindle 31 of a machining center by way of a tool holder 29 in which the dry cell accommodation 2 of the casing is directly fitted and fixed, while the axis of the spindle 31 or tool holder 29 is aligned with that of the stylus 5. In the operation, the spindle 31 is fed little by little toward an object of a workpiece 34 set on a table 33 of the machining center, whereby the head 7 of the spindle is allowed to come into contact with the workpiece 34 at the desired position. At this time, as shown in FIG. 7 by chain line, a closed circuit is formed by a path passing from the anode 19a to the cothode 19b of the dry cells 15 through the light emitting diodes 21, the stylus 5, the workpiece 5, the body 32 of the machining center, the spindle 31, the tool holder 29, the casing 1 of the touch sensor in sequence. The electricity which flows the closed circuit allows the diodes 21 to emit the light, whereby the contact of the stylus 5 with the workpiece 31 becomes informed. Then, the reading of the position of the fed spindle 31 makes it possible to find out the reference position of the spindle 31 with respect to the workpiece 34. On sensing the afore-said light emission of the diodes 21, the slow feeding of the spindle 31 is stopped. At this time, the sudden stop of the spindle 31 causes the stylus 5 to receive a reaction in the reverse direction from the workpiece 34, and then the stylus 5 is pressed and turned by little backwards around either the first or the second engaged part 13, 14 regardless of the pressure of the coil spring 18. However, there is no perfect removal of either of the balls 10, 11 from the first or second engaged part 13, 14, i.e. of the flange 8 from the cap 4. Next, when the spindle 31 is set back to the original position, the stylus 5 is made separate from the workpiece 34, and then returns to a normal position opposite right to the cap 4 owing to the pressure of the spring 18.

In the above-mentioned embodiment, the casing 1 is shaped so as to be fitted into the tool holder 29 which is attached to the spindle 31, but may possibly be formed into a tool-holder-like shape so as to be attached immediately to the spindle 31. Moreover, the stylus flange 8 of the movable member is provided with the balls 10, 11, 12, while the cap 4 of the stationary member is provided with the engaged parts 13, 14, 15, but it is possible to provide the cap 4 of the stationary member with balls, and to provide the flange 8 of the movable member with the engaged parts. Otherwise, it is possible to provide the respective members with the ball and the engaged part alternately.

As apparent from the above-mentioned description, the touch sensor embodying the present invention take the following effects. That is, there is no necessity of three bars provided in the stylus and three pairs of balls (six balls in all) supporting and regulating the afore-said balls as used in the prior art, since the present invention requires only three set of ball and its engaged part which are provided on the stylus and the casing. Accordingly, in comparison with the prior art, the number of constitional members can be decreased, and the provision of the balls and its engaged parts can be completed easily, whereby a cost of production can be reduced relatively.

In addition, the first engaged part is configured so as to regulate a straight movement on a plane perpendicular to the axis, and the second engaged part is configured so as to regulate a rotary movement on the axis, so that the stylus can be kept as steady as possible in the casing.

The above-mentioned embodiment includes a plurality of light emitting diodes 21 and electric sources 19. Instead, in cases where in the electrical circuit 35 there are employed a pair of exciting and detecting coil assemblies to be disposed around the spindle 31, there is no necessity of provision of such electrical means in the casing of the touch sensor. Besides, in addition to the connection way of the electrical circuit in the embodiment, sets of balls and its corresponding engaged part 10 and 13, 11 and 14, 12 and 14 are allowed to function respectively as switches. That is, a circuit with the connection in series of the afore-said three sets is designed to allow the flow of electricity when the contact of the ball and engaged part of any one of sets is loosened apart by the touch of the stylus with an object. In this example, it is possible to provide a machine tool with an indicating means, an electric source and a controller for circuit. The circuit is arranged so as to connect with the afore-said three sets of ball and engaged part in series when the casing of the touch sensor including the three sets is attached to the spindle 31 of the machine tool, directly or indirectly through a tool holder 29.

What is claimed is:

1. A device for supporting a stylus in a touch sensor comprising a casing, a stylus for detecting an object, arranged on a longitudinal central axis of the casing in such a manner that the greater part of the stylus protrudes through and from an end portion of the casing, one end portion of the stylus having a flange admitted in the casing, with the flange opposed to the end part of the casing, and a spring holding in the casing for pressing said flange of the stylus outwards, wherein a ball is provided at each of three abaxial positions relative to the axis of the casing, on one of the mutually opposite faces of said flange of the stylus and the end part of the casing while an engaged part with which the ball is allowed to come into contact is configured at each of three corresponding positions on the other of said opposite faces, the first engaged part being shaped into an apparently circular sunken hollow in which one of the balls is fitted partially so as to prevent the stylus from moving straight on one plane perpendicular to the axis of the casing, the second engaged part being shaped into a sunken groove of rectangular shape in section, and of a direction substantially toward said hollow, in which the other of the balls is fitted partially so as to ensure the stylus to be prevented from rotating around the axis of the casing, and the third engaged part being shaped into a flat face which another of the balls touches.

2. An stylus support construction in a touch sensor as defined in claim 1, wherein said first engaged part shaped into a hollow and second engaged part shaped into a groove are formed respectively by carving said other of the opposite faces.

* * * * *